(12) United States Patent
Sanchez et al.

(10) Patent No.: US 7,577,599 B2
(45) Date of Patent: Aug. 18, 2009

(54) METHOD AND SYSTEM FOR PROCESSING ELECTRONIC PAYMENT TRANSACTIONS

(75) Inventors: Douglas J. Sanchez, Miami, FL (US); Trung Nguyen, Sunrise, FL (US); Michael Palermo, Coral Springs, FL (US)

(73) Assignee: First Data Corporation, Greenwood Village, CO (US)

( * ) Notice: Subject to any disclaimer, the term of this patent is extended or adjusted under 35 U.S.C. 154(b) by 486 days.

(21) Appl. No.: 10/799,254

(22) Filed: Mar. 12, 2004

(65) Prior Publication Data

US 2005/0203842 A1 Sep. 15, 2005

(51) Int. Cl.
*G06Q 40/00* (2006.01)

(52) U.S. Cl. .......................................... 705/35; 705/36

(58) Field of Classification Search ................... 705/1, 705/39–40, 26, 44, 35–38
See application file for complete search history.

(56) References Cited

U.S. PATENT DOCUMENTS

| | | | |
|---|---|---|---|
| 6,609,113 B1 | 8/2003 | O'Leary et al. | |
| 7,006,993 B1 | 2/2006 | Cheong et al. | |
| 7,051,002 B2 * | 5/2006 | Keresman et al. | 705/44 |
| 2002/0026396 A1 * | 2/2002 | Dent et al. | 705/35 |
| 2003/0028484 A1 * | 2/2003 | Boylan et al. | 705/40 |
| 2005/0010488 A1 * | 1/2005 | Itakura et al. | 705/26 |
| 2005/0171899 A1 * | 8/2005 | Dunn et al. | 705/39 |

FOREIGN PATENT DOCUMENTS

WO 2005091814 A2 10/2005

OTHER PUBLICATIONS

International Search Report and Written Opinion for PCT/US2005/004738.

* cited by examiner

*Primary Examiner*—Thu Thao Havan
(74) *Attorney, Agent, or Firm*—Sutherland Asbill & Brennan LLP (57) ABSTRACT

Systems and methods are provided for processing electronic payment transaction information. A transaction software engine operating in a server at a merchant's site effectuates the authorization of electronic payment requests and the settlement of authorized electronic payments. Authorization requests are sent by a terminal at the merchant's site to the server as each transaction occurs. Batches of settlement requests are processed after a predetermined time, although the transactions are processed on a transaction-by-transaction basis. The transaction software engine is capable of accepting data of varying formats and re-encoding such data so that it can be processed by a host associated with a data transaction provider. Accordingly, the transaction software engine processes data received from a variety of terminals as well as data sent to and received from a variety of data transaction providers.

46 Claims, 5 Drawing Sheets

Fig. 3

| Merchant Number 402 | Terminal Serial Number 404 | Message Type Identifier 406 | Account Number 408 | Expiration Date 410 | Track-2 Data 412 |
|---|---|---|---|---|---|
| Track-1 Data 414 | Transaction Amount 416 | Transaction Number 418 | Transaction Date 420 | Transaction Time 422 | Error Message 424 |

METHOD AND SYSTEM FOR PROCESSING ELECTRONIC PAYMENT TRANSACTIONS

FIELD OF THE INVENTION

The invention relates to systems and methods for processing electronic transactions, and more specifically to a system and method for receiving, processing and transmitting electronic payment transaction information.

BACKGROUND OF THE INVENTION

Merchants typically accept various forms of payments from consumers in the course of engaging in the sale of goods and/or services. Some of these transactions include payments by cash, by check, debit card, credit card and the like.

Many of these forms of payments are electronic in nature (e.g., credit card, debit card, electronic check payments, stored value cards, loyalty points redemptions, electronic benefits transfers) and afford certain conveniences to consumers. For example, when electronic payments are accepted, consumers do not have to determine whether they have a sufficient amount of cash on their person, they often do not have to transfer funds to the merchant immediately, and at times, can purchase goods or services utilizing a line of credit.

Such electronic payment offerings also benefits merchants. For example, by offering an array of payment options to consumers, merchants typically recognize an increase in sales.

Nevertheless, present electronic payment systems have various drawbacks. For example, electronic payment systems that are located at a merchant site can have limitations with respect to the type of terminals that can interact with such system. Typically, a merchant site has one or more central computers or servers that support electronic payment terminals that are used at the merchant. Only those terminals that are configured to interact with the merchant computer or server can be used. One solution is to have multiple servers or computers, but such a system can be expensive and cumbersome.

Another solution is continuously modify the server or computer as new terminals are desired to be used at the merchant site. Such a solution, however, can require significant maintenance of the merchant's computer software and hardware.

In addition, electronic payment systems typically communicated via a dial-up modem. Such a system is inconvenient to consumers and merchants as transactions can take a long time to be completed, causing delay to the consumer and merchant. In addition, such systems do not support certain encryption techniques which provides increased security to the data transmitted over the electronic payment system. Moreover, using a dial-up modem requires that a plurality of telephone lines be used if a merchant desires to support transactions using numerous electronic payment terminals.

Also, many electronic terminals are configured such that transaction data relating to the settlement process is stored by such terminals and only sent to the merchant server as a batch. Such an arrangement results in delay when the settlement process is effectuated.

SUMMARY OF THE INVENTION

The invention relates to systems and methods for processing transactions, and more specifically to a system and method for receiving, processing and transmitting electronic payment transaction information which overcomes the above-mentioned disadvantages. The system and method accesses a transaction software engine that effectuates the authorization of electronic payment requests and the settlement of authorized electronic payments. The transaction software engine, in accordance with an embodiment of the invention, resides at a merchant's site and more specifically within the merchant's server or computer which is in communication with one or more network terminals. With such a system, data respecting certain transactions (e.g., authorization, settlement, etc.) are sent by a terminal to the software engine. Typically, authorization requests are processed when the electronic payment request is made. Settlement requests, in accordance with an embodiment of the invention, are stored by the merchant's terminal until a predetermined time, and then each of the requests are transmitted on a transaction-by-transaction basis from the engine to a data transaction host for processing.

In addition, the software engine enables the transmission of data over the Internet. As a result, the amount of time to process payment authorization and settlement is reduced as compared with the exclusive use of traditional telephone lines.

Moreover, the transaction software engine is capable of accepting data of varying formats and re-encoding such data so that it may be processed by the transaction software engine. As a result, the transaction software engine can process data that is received from and sent to a variety of terminals as well as data that is sent to and received from a variety of data transaction providers host.

BRIEF DESCRIPTION OF THE DRAWINGS

Further objects, features and advantages of the invention will become apparent from the following detailed description taken in conjunction with the accompanying drawings showing illustrative embodiments of the invention, in which.

DETAILED DESCRIPTION

The invention relates to systems and methods for processing transactions, and more specifically to a system and method for receiving, processing and transmitting electronic payment transaction information. The system and method accesses a transaction software engine that effectuates the authorization of electronic payment requests and the settlement of authorized electronic payments. The transaction software engine, in accordance with an embodiment of the invention, resides at a merchant's site and more specifically within the merchant's server or computer which is in communication with one or more network or serial terminals. With such a system, data respecting certain transactions (e.g., authorization, settlement, etc.) may be sent by a terminal to the software engine as each transaction occurs (as opposed to a group of transaction which are sent in a batch).

In addition, the software engine enables the transmission of data over the Internet. As a result, the amount of time to process payment authorization and settlement is reduced as compared with the exclusive use of traditional telephone lines.

Moreover, the transaction software engine is capable of accepting data of varying formats and re-encoding such data so that it may be processed by the transaction software engine. As a result, the transaction software engine can process data that is received from and sent to a variety of terminals as well as data that is sent to and received from a variety of data transaction providers host.

The System

Figure 1:
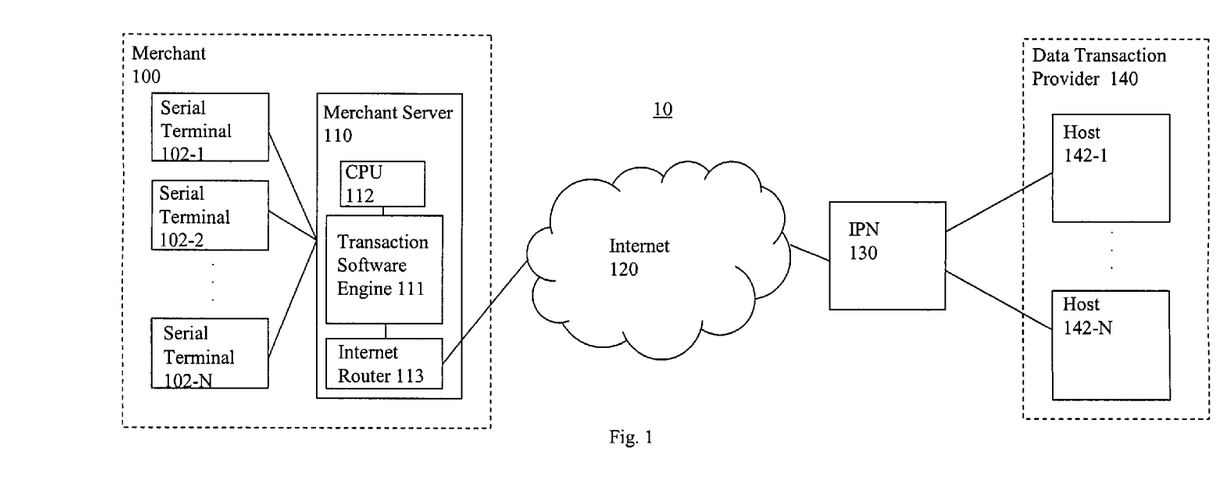
FIG. 1 is a block diagram of an electronic payment transaction system, in accordance with an embodiment of the invention.

FIG. 1 is a block diagram illustrating electronic payment transaction system 10 that incorporates features of the present invention. System 10, among other things, handles authorization of electronic payment transactions and settlement of such transactions by supporting communication between merchants, such as merchant 100, and payment processors, such as data transaction provider 140. As shown in FIG. 1, various entities may be involved in such processing. For example, system 10 enables communication between merchant 100 and data transaction provider 140 through a public network, such as the Internet 120, and, for example, a third party Internet Protocol Network (IPN) 130. In one embodiment, IPN 130 may be provided by Datawire Communication Network's Transaction Delivery Network.

Merchant 100 is any individual or entity that makes a request for authorization and/or settlement of an electronic payment transaction. It should be noted that the term "payment" used herein may include a transaction involving the payment of funds or the credit of funds. Typically, merchant 100 has one or more credit/debit card processing terminals for processing electronic payment requests. For example, in FIG. 1, merchant 100 has several terminals 102-1 to 102-N which are in communication with merchant server 110. In FIG. 1, terminals 102-1 to 102-N are connected to merchant server 110 by a serial connection, and therefore these terminals are referred to as "serial terminals." An example of a serial terminal 102 is Verifone's TRANZ model number 380.

When, for example, an electronic payment transaction request is generated by, let's say, serial terminal 102-1, data packets are sent from terminal 102, via a serial connection, to merchant server 110. Merchant server 110 comprises at least the following components: a central processing unit 112, transaction software engine 111 and Internet router 113.

CPU 112 may be embodied as a single commercially available processor. Alternatively, in another embodiment, CPU 112 may be embodied as a number of such processors operating in parallel.

Transaction software engine 111 is operable to store one or more instructions, discussed further below in conjunction with FIGS. 3-6, which the CPU 112 is operable to retrieve, interpret and execute. For example, engine 111 preferably stores processes for authorizing and settling electronic payments as described below.

CPU 112 preferably includes a control unit, an arithmetic logic unit (ALU), and a CPU local memory storage device, such as, for example, a stackable cache or a plurality of registers, in a known manner. The control unit is operable to retrieve instructions from transaction software engine 111. The ALU is operable to perform a plurality of operations needed to carry out instructions. The CPU local memory storage device is operable to provide high-speed storage used for storing temporary results and control information.

Internet router 113 connects merchant server 10 to Internet 120, and may be, for example, a D-Link Router Model DI 704. In addition, merchant server 110 may also be connected to hosts 142-1 through 142-N via dial-up modem (not shown). In accordance with an embodiment of the invention, the communication between merchant server 110 and host 142 is, by default, attempted via Internet 110 and IPN 130. Thus, in such case, dial-up modem communication between transaction merchant server 110 and host 142 is only used when communication cannot be established by private network 130.

As discussed more fully below, data transaction provider hosts 142-1 through 142-N are configured for, among other things, receiving a request to process electronic payment transactions, determining the type of electronic payment transactions that are requested, authorizing or rejecting the electronic payment transactions, and settling the transactions. Data transaction provider hosts 142-1 through 142-N is configured to process conventional credit card and debit card transactions, electronic checks, gift cards, and the like.

Figure 2:
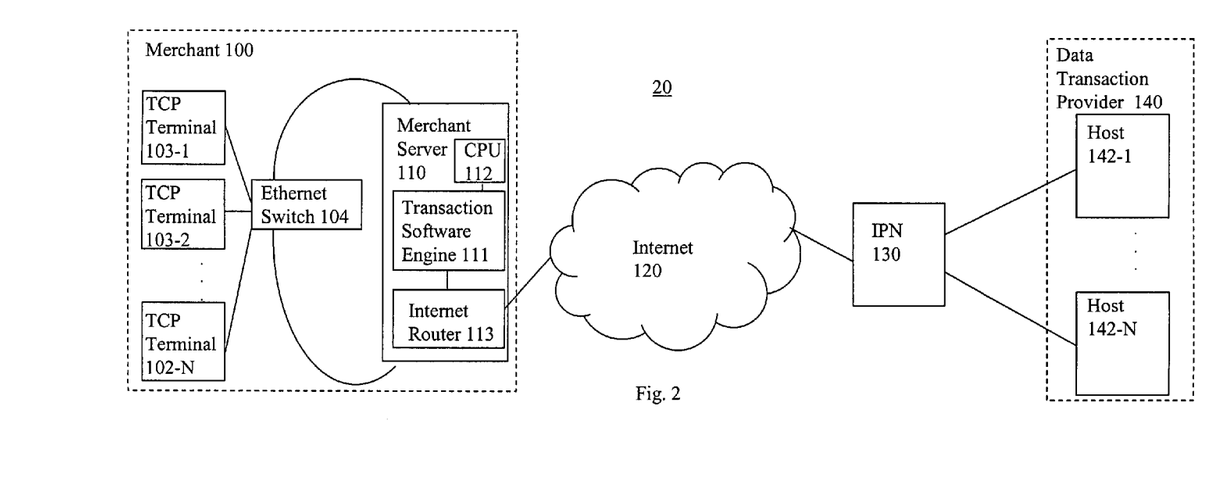
FIG. 2 is a block diagram of an electronic payment transaction system, in accordance with another embodiment of the invention.

FIG. 2 is a block diagram illustrating electronic payment transaction system 20 in accordance with an embodiment of the invention. Payment transaction system 20 is similar to system 10—in that a merchant (e.g., merchant 101) communicates with host 142 of data transaction provider 140—via Internet 120 and IPN 130 but system 20 provides for a Transmission Control Protocol/Internet Protocol (TCP/IP) connection between the terminals and the merchant server. Thus, as illustrated by FIG. 2, system 20 supports communication between TCP terminals 103-1 through 103-N and merchant server 110 via Ethernet switch 104. An example of TCP terminal 103 is the Omni 3750. Like merchant server 100 of system 10, merchant server 110 of system 20 comprises transaction software engine 111, CPU 112 and internet router 113.

The Transaction Software Engine

Figure 3:
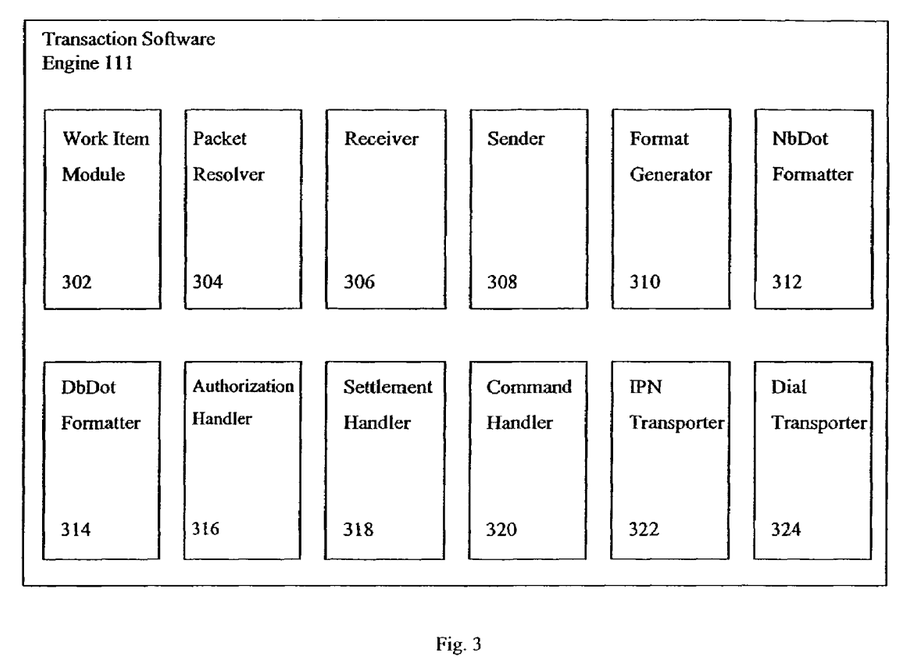
FIG. 3 is a block diagram of modules incorporated within a transaction software engine that processes electronic payment transactions, in accordance with an embodiment of the invention.

Transaction software engine 111 is operable to store instructions for, among other things, authorizing and settling electronic payments as described below. Transaction software engine 111 is capable of providing such instructions by, in accordance with an embodiment of the invention, accessing one or more transaction modules instantiated by engine 111. Such modules are illustrated in FIG. 3 and include: work item module 302, packet resolver module 304, receiver module 306, sender module 308, format generator module 310, NBDot formatter module 312, DBDot formatter module 314, authorization handler module 316, settlement handler module 318, command handler module 320, IPN transporter module 322 and dial transporter module 324. These modules will now be described below with reference to FIG. 3. The process of authorizing and settling electronic payment transactions, by utilizing modules 302 through 324 of engine 111, is described below with reference to FIGS. 5 and 6.

It should be noted that DBDot, NBDot and SVDot are data format types that comprise one or more data fields described below with reference to FIGS. 4 and processed by one or more of hosts 142-1 to 142-N. These data formats typically differ with respect to length and/or order of the data fields included by the respective format type and may, in some instances, include additional information useful in authorization and settlement processing.

Referring to FIG. 3, work item module 302 is responsible for temporarily storing data that is received by merchant server 110 from, for example, serial terminal 102, TCP terminal 103 or host 142. The data is temporarily stored such that engine 111 can process the data by one or more of the other modules illustrated in FIG. 3. Work item module 302 is accessed each time terminal device 102 or 103 establishes a communication session with transaction software engine 111. Thus, each time data is sent to engine 111, a work item is created by work item module 302 and, by accessing the other modules, enables the processing of such data.

Packet resolver 302 determines the request type that is associated with the received data. Thus, packet resolver 302 determines whether the received data relates to a request for payment authorization, settlement request or a command.

It should be noted that the term "authorization" refers to approval by data transaction provider 140 to validate a transaction for a merchant 100 or 101. Such authorization indicates, for example, the availability of a purchaser's credit limit at the time the authorization is requested or the validity of the consumer's account number. "Settlement" refers to the process of exchanging financial data resulting from sales transactions, cash disbursements, or merchandise credits, which are ultimately billed to an account of purchaser making an electronic payment. A "command" is an instruction that controls transaction software engine 111, and may include the "stop" command which terminates one or more communications, a "start" command which restores data flow of system 10 or 20, "power off" which shuts down engine 111, "power on" which turns on engine 111, and the like.

Receiver module 306 enables the processing of data that is received from transaction software engine 111. These devices include serial terminals 102- through 102-N, TCP terminals 103-1 through 103-N or hosts 142-1 through 142-N. Sender module 308, however, enables the processing of data that is received by transaction software engine 111, such as serial terminals 102- through 102-N, TCP terminals 103-1 through 103-N or hosts 142-1 through 142-N. Handling incoming and outgoing information streams, by receiver module 306 and sender module 308, respectively, facilitates the implementation of maintenance and enhancements to engine 111.

A built-in timer is incorporated into modules 306 and 308, such that communications made by systems 10 or 20 may be terminated in the event of a communication failure. In accordance with one embodiment of the invention, the time is set to 60 seconds.

Format generator 310 identifies the manner in which the received data should be formatted. The format that is designated for data received and processed by transaction software engine 111 is, in accordance with an embodiment of the invention, dictated by the host 142 that is targeted for the transaction. Thus, format generator 310 determines which host 142 is designated to handle the transaction and identifies the data format that is supported by such host 142. Determining which host 142 is designated to handle the transaction is accomplished by reading the data stored in the header of a packet for the data format (e.g., NBDot, SVDot, etc.) and the target host designated to process such data format. Thus, in such a manner, when receiving data from terminal 102 or 103, engine 111 determines whether the received data is in, for example, the DBDot, NBDot, SVDot or some other data format type. Upon identifying the data format of the received data, format generator identifies the appropriate formatter to be accessed to process received data. Two examples of formatter modules illustrated in FIG. 3 are NBDot formatter module 312 and DBDot formatter module 314, although of course transaction software engine 111 may be provided with additional formatter modules such that additional data formats may be supported by engine 111 as required by hosts 142-1 through 142-N.

Formatter modules 312 and 314 receive data, which is typically received in the form of packets in a stream, and parse such packets based on the packet's fields. A list of fields that, in accordance with an embodiment of the invention, may be included in communicated data packets and used by formatter modules 312 and 314 are described below with reference to FIG. 4.

Authorization handler module 316 is responsible for processing authorization requests. Authorization module handler 316 generates the packet header for data packets relating to authorization. Such header includes, among other things, identification information for identifying the packet as carrying data for an authorization request. In addition, authorization handler module 316 delegates the authorization request data to the appropriate transporter. (See description of IPN transporter module 322 and dial transporter module 324 below.)

Settlement handler module 318 is responsible for processing settlement requests. Settlement handler module 318 generates the packet header for data packets relating to settlement requests. Such header includes, among other things, identification information for identifying the packet as carrying data for a settlement request. In addition, settlement handler module 318 delegates the authorization request data to the appropriate transporter. (See description of IPN transporter module 322 and dial transporter module 324 below.)

Command handler module 320 processes data that is received from a remote computer for controlling transaction software engine 111. This module parses and executes commands that allow for the remote control of transaction software engine 111. Thus, if a merchant desires to issue a command to stop or start transaction software engine 111 from, for example, a remote computer, commands issued from such computers are detected and processed by handler 320 of engine 111.

IPN transporter module 322 provides formatting for transmitting and receiving data packets over the Internet and dial transporter module 324 provides formatting for transmitting and receiving data packets using a dial-up modem. In accordance with an embodiment of the invention, the data format used is an XML-based packet format.

NBDot Data Fields

Figure 4:
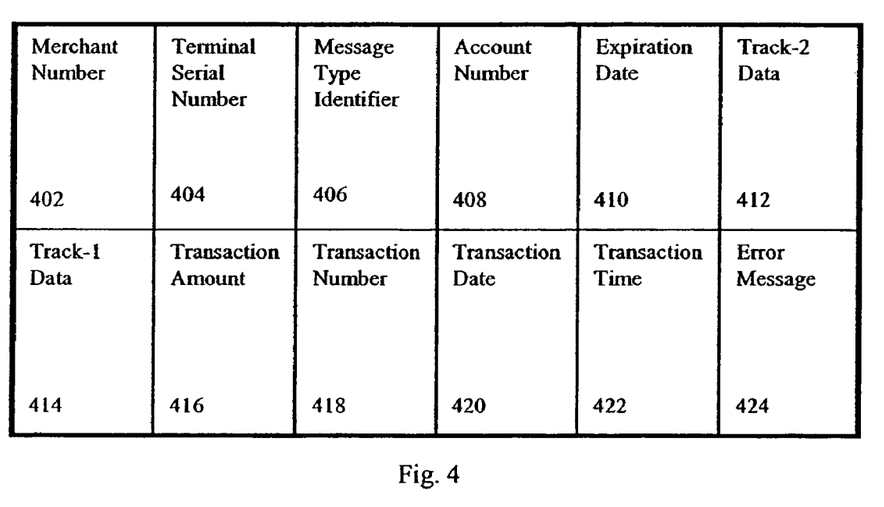
FIG. 4 illustrates data fields that are populated when processing electronic payment transactions, in accordance with an embodiment of the invention.

FIG. 4 illustrates fields that are incorporated in data packets that are handled by systems 10 and 20 to process authorization and settlement requests. When data packets are communicated among the various devices shown in FIGS. 1 and 2, these fields either store information pertinent to the request or the field remains empty. In another embodiment of the invention, one or more fields may store null data (such as the number 0) rather than being empty, such that each field either stores pertinent data or null data.

The fields incorporated in the data packets used by systems 10 and 20 are as follows: merchant number field 402, terminal serial number field 404, message type identifier field 406, account number field 408, expiration date field 410, transck-2 data field 412, track-1 data field 414, transaction amount field 416, transaction number 418, transaction date field 420, transaction time field 422 and error message field 424.

Merchant number field 402 refers to a unique merchant number that is assigned by data transaction provider 140 for each merchant 100, 101 that has access to system 10, 20, respectively. Terminal serial number 404 refers to a unique terminal number that is stored by each of terminals 102-1 through 102-N and 103-1 through 103-N and is provided to engine 111 to indicate the source of a transmitted data packet each time a data packet is transmitted to engine 111.

Message type identifier field 406 identifies the type of message that is being transmitted across system 10 or 20. Message type may include: authorization (i.e., a request for authorization from terminal 102 or 103 to engine 111, or from engine 111 to host 142), authorization response (i.e., an authorization response from host 142 to engine 111, or from engine 111 to terminal 102 or 103), settlement (i.e., a request for settlement from terminal 102 or 103 to engine 111, or from engine 111 to host 142), settlement response (i.e., an settlement response from host 142 to engine 111), close session (i.e., a request to terminate a session), close session response (i.e., a confirmation to a request for terminating a session).

Account number field 408 refers to the identification number of the account from which the funds are to be transferred to effectuate an electronic payment. Expiration date field 410 refers to the date in which the electronic payment card (e.g., credit card, debit card, gift card) is to expire.

Track 1 field 412 and track 2 field 414 comprise information that is stored on the magnetic strip of user's credit card, debit card, gift card, etc. In accordance with an embodiment of the invention, track 1 field is 79 bytes and comprises the account number, expiration date, name and discretionary data. Track 2 field 414, in accordance with an embodiment of the invention, is 40 bytes in length and includes the account number, expiration date and discretionary number associated with the user's card.

Transaction amount field 416 refers to the amount of funds that are involved in the electronic payment for which an authorization or settlement request is made. Transaction number field 418 refers to a unique identifier that is used to identify each transaction processed by systems 10 and 20.

Transaction date field 420 and transaction time field 422 refer to the date and time, respectively, upon which each electronic payment transaction was processed by systems 10 and 20.

Error message field 424 stores information containing one or more error notifications which are communicated to merchant 100, 101 when one or more errors occur. In accordance with an embodiment of the invention, transaction software engine stores the error message in error message field 424 inside the same data packet that terminal 102 or 103 is expecting, and therefore the terminal can automatically display the received error message.

Other format types—such as DBDot or SVDot—may be used. DBDot and SVDot utilize many of the same data fields as described above with respect to NBDot. These data formats may differ with respect to length and/or order of the data fields included by the respective type and may, in some instances, include additional information useful in authorization and settlement processing.

Authorization Requests

When an electronic payment is effectuated, merchant 100 or 101 typically inputs the pertinent transaction information relating to the purchase (e.g., merchant identification information, consumer identification information, consumer account information, payment type, transaction amount, date, time) into an electronic payment processing terminal, such as serial terminal 102 or TCP/IP terminal 103. This may be accomplished by, for example, swiping a card that contains the consumer identification information, consumer account information and entering the transaction amount by a keypad situated on terminal 102 or 103. The remaining information may be generated automatically by terminals 102 or 103.

The inputted information is then entered thereby allowing merchant 100 or 101 to make a request for authorizing the payment transaction. As described above, the authorization process enables approval by data transaction provider 140 to validate a transaction for a merchant 100 or 101. This validation ensures, for example, the availability of a purchaser's credit limit at the time the authorization is requested, that the account data that is provided is valid, and the like.

Figure 5:
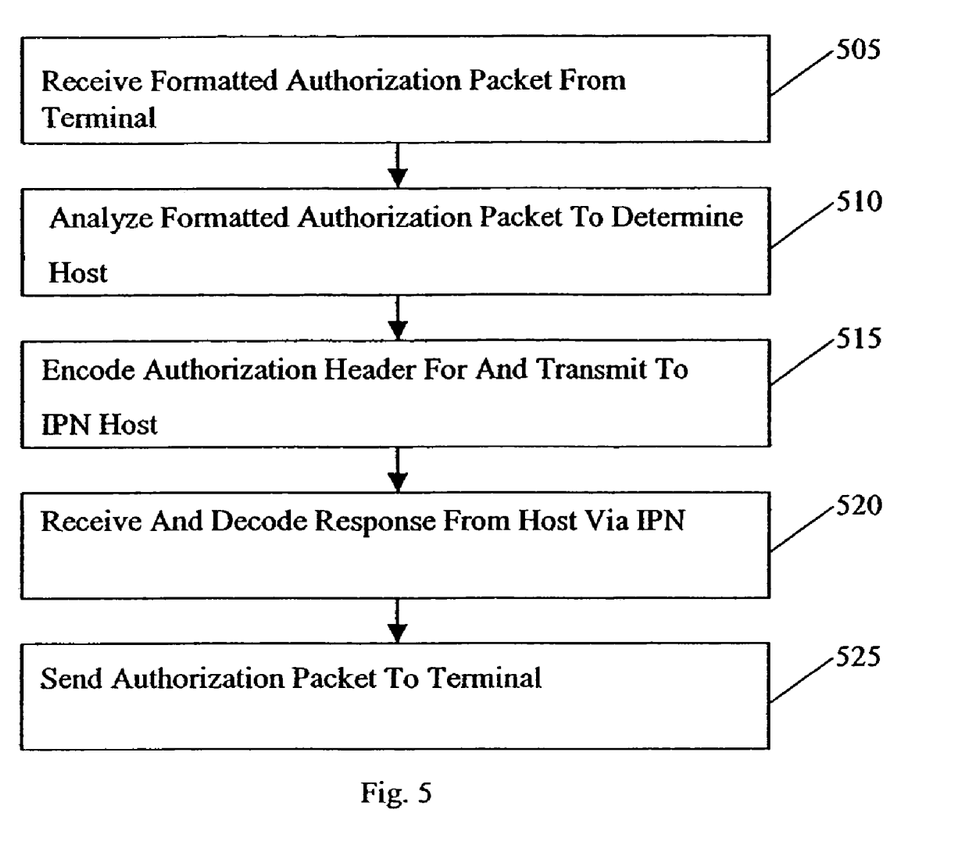
FIG. 5 is a flowchart illustrating the method of authorizing an electronic payment request, in accordance with an embodiment of the invention.

FIG. 5 is a flowchart which illustrates the process of performing an authorization request, in accordance with an embodiment of the invention. Such process is described with further reference to systems 10 and 20 of FIGS. 1 and 2, respectively, and the software modules of FIG. 3.

At step 505, work item module 302 of transaction software engine 111 receives authorization data packets which includes data relating to a transaction that occurred at merchant 100 or 101. The authorization data populates at least the following fields of the data packets: merchant number 402, terminal serial number 404, message type identifier 406 (indicating that, in this instance, the message type relates to an authorization request), account number 408, expiration date 410, transaction amount 416, transaction number 418, transaction date 420 and transaction time 422.

Next, at step 510, format generator module 310, analyzes the formatted authorization packets to determine which of host 142-1 through 142-N is delegated to receive the authorization request. Upon determining the target host, format generator module 310 transmits the authorization data packets to the formatter that is associated with the target host 142, such that the authorization data packets can be read and processed by the target host 142. Thus, the data packets are forwarded from the format generator module 310 to NBDot Formatter 312 or DBDot formatter 314 (or some other formatter instantiated by transaction software engine 111 and associated with one or more of hosts 142-1 through 142-N).

At step 515, formatter 312 or 314 (depending on the targeted host data formatting requirements) encodes the header of the received authorization data packets for transmission to the target host 142. In so doing, authorization handler module 316 chooses either IPN transporter module 322 (if the data packets are transmitted over a IPN 130) or dial transporter module 324 (if the data packets are transmitted over a dial-up modem). In accordance with an embodiment of the invention, the communication of data packets between engine 111 to host 142 is, by default, attempted via IPN 130. Thus, in such case, dial-up modem communication between transaction software engine 111 and host 142 is only used when communication cannot be established by private network 130.

In accordance with an embodiment of the invention, the header is encoded into Extensible Markup Language (XML)—a well known markup language which facilitates the interchange of structured data. In addition, the XML formatted data packets are communicated between transaction software engine 11 and host 142 over the Internet 120 using, in accordance with an embodiment of the invention, the Secured Sockets Layer (SSL) protocol. SSL is a well know protocol that transmits communications over the Internet in an encrypted form. SSL ensures that the information is sent, unchanged, and only to the host that is intended by merchant 100 or 101.

After transaction software engine 111 sends the authorization request to host 142 (at step 515), engine 111 then awaits a response from host 142. In accordance with an embodiment of the invention, the response is also in XML language. Upon receiving the response, at step 520, engine 111 decodes the response received from host 142 via IPN 130 and then forwards the response to terminal 102 or 103 (step 525). The authorization response is typically in the form of transaction acceptance or rejection. Once the authorization response is received at terminal 102 or 103 of merchant 100 or 101, respectively, such merchant is informed of the authorization response as provided by terminal 102 or 103 and the authorization request process is complete.

It should be noted that the method for processing an authorization request for a serial terminal 102 versus a TCP terminal 103 are quite similar. With TCP terminal 103, however, connection and disconnection steps arte typically provided by system 20. When terminal 103 initially receives transaction data for transmission to software engine 111, terminal 103 opens a TCP/IP socket and connects to engine 111 using a configured IP address. Similarly, after the authorization request is processed, engine 111 sends a signal to close the connection between engine 111 and terminal 103.

Settlement Requests

Authorized transactions are then settled by systems 10 and 20. In accordance with an embodiment of the invention, once a transaction is authorized, the data required for settlement of such transaction is communicated to transaction software engine 111. Engine 111 is configured to store the authorization data for transactions that occurred during a predetermined period—e.g., for a given day until midnight—and when such predetermined period is met, engine 111 receives the settlement data from terminals 102 and 103 and then engine 111 and transmits to the data to host 142 on a transaction-by-transaction basis for the transactions that transpired for that period. Thus, each authorization request may be sent by engine 111 to host 142 via Internet 120 and IPN 130 as its own request. This is so even though more than one of the transaction-by-transaction requests may be in transmission and/or processed by, for example, host 142 at a given time.

As described above, the settlement process refers to the process of exchanging financial data resulting from a sales transactions, cash disbursements, or merchandise credits, which are ultimately billed to an account of the purchaser making an electronic payment.

Figure 6:
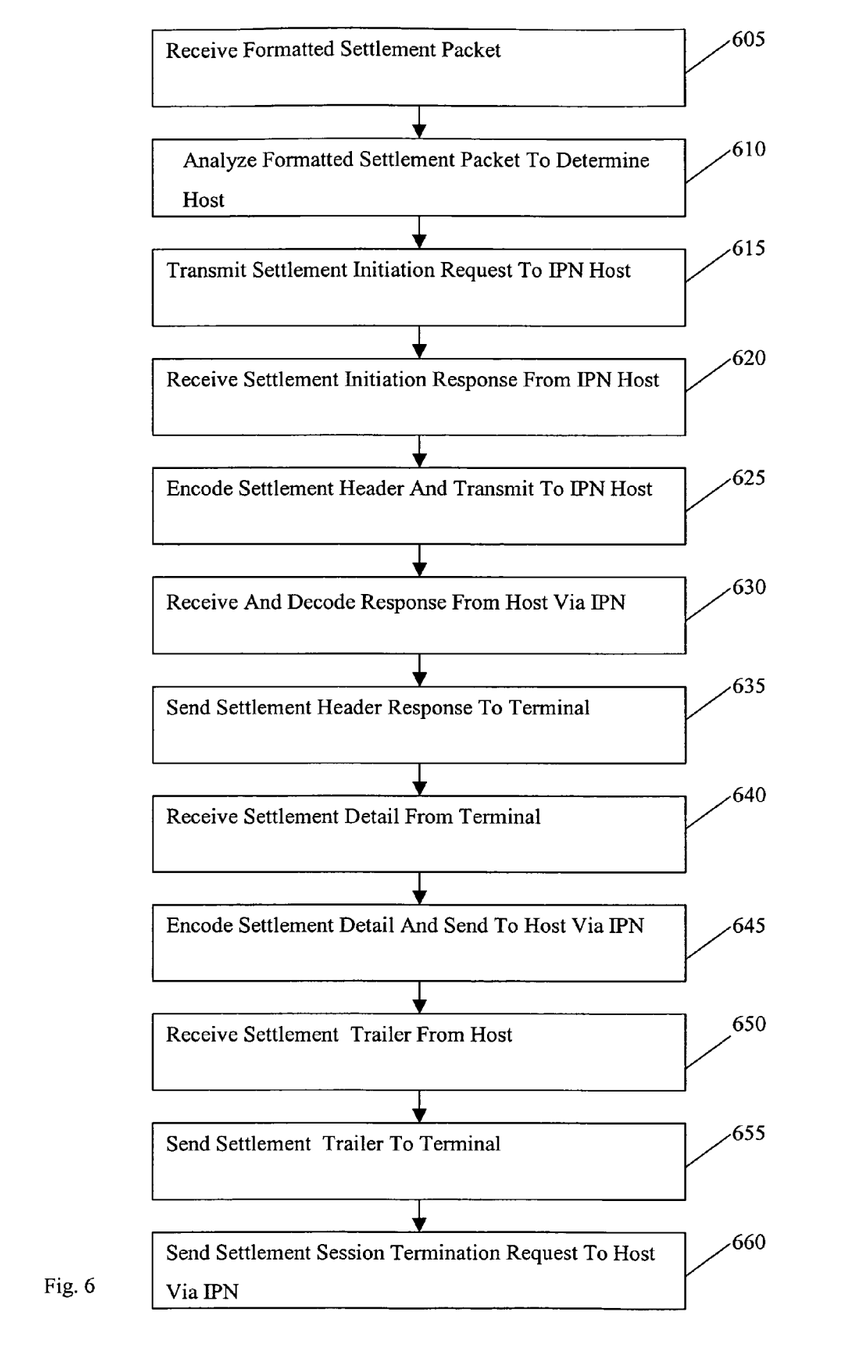
FIG. 6 is a flowchart illustrating the method of settling electronic transactions, in accordance with an embodiment of the invention.

FIG. 6 is a flowchart which illustrates the process of performing a settlement request, in accordance with an embodiment of the invention. Such process is described with further reference to systems 10 and 20 of FIGS. 1 and 2, respectively, and the software modules of FIG. 3.

At step 605, work item module 302 of transaction software engine 111 receives settlement data packets which include data relating to a transaction that occurred at merchant 100 or 101. The settlement data populates at least the following fields of the data packets for each transmission to be settled: merchant number 402, terminal serial number 404, message type identifier 406 (indicating that, in this instance, the message type relates to a settlement request), account number 408, expiration date 410, transaction amount 416, transaction number 418, transaction date 420 and transaction time 422.

Next, at step 610, format generator module 310, analyzes the formatted settlement packets to determine which of host 142-1 through 142-N is delegated to receive the settlement request. Upon determining the target host, format generator module 310 transmits the settlement data packets to the formatter that is associated with the target host 142, such that the settlement data packets can be read and processed by the target host 142. Thus, the data packets are forwarded from the format generator module 310 to NBDot Formatter 312 or DBDot formatter 314 (or some other formatter stored by transaction software engine 111 and associated with one or more of hosts 142-1 through 142-N).

Next, at step 615, transaction software engine 111 transmits a settlement initiation request to host 142 and, at step 620, engine 111 awaits to receive an initiation response back from host 142.

Once such initiation handshake occurs, at step 625, transporter 322 or 324 encodes the header of the received settlement data packets for transmission to the target host 142. In so doing, settlement handler module 318 chooses either IPN transporter module 322 (if the data packets are transmitted over IPN 130) or dial transporter module 324 (if the data packets are transmitted over a dial-up modem). In accordance with an embodiment of the invention, the communication of data packets between engine 111 to host 142 is, by default, attempted via IPN 130. Thus, in such case, dial-up modem communication between transaction software engine 111 and host 142 is only used when communication cannot be established by private network 130.

In accordance with an embodiment of the invention, the header is encoded into XML. In addition, the XML formatted data packets are communicated between transaction software engine 111 and host 142 over the Internet 120 using, in accordance with an embodiment of the invention, the SSL protocol to ensure that the information is sent, unchanged, and only to the host that is intended by merchant 100 or 101.

After transaction software engine 111 sends the settlement request to host 142 (at step 625), engine 111 then awaits a response from host 142 via IPN 130. In accordance with an embodiment of the invention, the response is also in XML language. Upon receiving the response, at step 630, engine 111 then sends a packet header response to terminal 102 or 103 (step 635) requesting the settlement information (described above) which is sent to host 142. Transaction software engine 111 then receives the settlement detail from terminal 102 and 103 (step 640). The settlement detail is then encoded at the instruction of format generator module 310 and sent to the targeted host 142 (step 645). Once the complete batch of settlement data is received and processed by host 142, engine 111 receives a settlement packet trailer indicating the end of settlement data packets (step 650). This trailer is then forwarded by engine 111 to terminal 102 or 103 (step 655) and then a settlement session termination request is sent to host 142 (step 660) indicating the end of the settlement process.

It should be noted that the method for processing a settlement request for a serial terminal 102 versus a TCP terminal 103 are quite similar. With TCP terminal 103, however, connection and disconnection steps arte typically provided by system 20. Thus, when terminal 103 initially receives transaction data for transmission to transaction software engine 111, terminal 103 opens a TCP/IP socket and connects to engine 1111 using a configured IP address. Similarly, after the settlement request is processed, engine 111 sends a signal to close the connection between engine 111 and terminal 103.

The foregoing merely illustrates the principles of the invention. It will thus be appreciated that those skilled in the art will be able to devise numerous other arrangements which embody the principles of the invention and are thus within its spirit and scope.

For example, although the electronic payment processing terminals described herein are the Tranz 380 and Omni 3750, other types of terminals may be used. In addition the connections of these devices to merchant-server 110 may be, in addition to an Ethernet or TCP/IP connection, a WI-FI hub with USB connectivity, a wireless connection, or the like.

The invention claimed is:

1. A method for processing an electronic payment transaction, comprising:
   receiving, by a processor located at a merchant site, a request to process an electronic payment transaction from at least one payment terminal located at the merchant site, the request having a format type;
   determining, by the processor located at the merchant site, the format type of the request from among a plurality of predetermined second format types;
   identifying, by the processor located at the merchant site, a host computer configured to process the determined format type from among a plurality of host computers, each host computer being configured to process at least one of the predetermined second format types; and
   transmitting the request to the identified host computer.

2. The method of claim 1 further comprising:
   receiving a notification from the identified host indicating whether the request is approved.

3. The method of claim 1 further comprising:
   receiving a notification from the identified host indicating whether the request contains an error message.

4. The method of claim 2 further comprising:
   sending the notification to the at least one payment terminal.

5. The method of claim 3 further comprising:
   sending the notification to the at least one payment terminal.

6. The method of claim 1, wherein the request comprises data packets having header information.

7. The method of claim 6, further comprising encoding the header information to enable communication of the request between the payment terminal and the host computer.

8. The method of claim 7, wherein the header information is encoded using an Extensible Markup Language.

9. The method of claim 1, wherein the request to process the electronic payment transaction relates to authorizing the transaction.

10. The method of claim 1, wherein the request to process the electronic payment transaction relates to settling the transaction.

11. A method for settling a plurality of electronic payments, comprising:
    requesting from a terminal information relating to settlement of the plurality of electronic payments;
    receiving, by a processor located at a merchant site, at least one respective data packet having settlement information for each payment of said plurality of electronic payments;
    determining, by the processor located at the merchant site, the format type of each respective data packet from among a plurality of predetermined second format types;
    identifying a host computer configured to process the determined format type of each respective data packet; and
    transmitting each respective data packet to the identified host computer, wherein the identified host computer is configured to process the format type of said each respective data packet.

12. The method of claim 11 further comprising:
    receiving a notification from the identified host indicating whether the settlement is processed.

13. The method of claim 11 further comprising:
    receiving a notification from the identified host indicating whether the settlement generates an error message.

14. The method of claim 12 further comprising:
    sending the notification to the payment terminal.

15. The method of claim 13 further comprising:
    sending the notification to the payment terminal.

16. The method of claim 11 wherein the request comprises data packets having header information.

17. The method of claim 16, further comprising encoding the header information to enable communication of the request between the payment terminal and the host computer.

18. The method of claim 17 wherein the header information is encoded using an Extensible Markup Language.

19. A system located at a merchant site for processing an electronic payment transaction, comprising:
    a processor located at a merchant site, the processor configured to:
        receive a request to process an electronic payment transaction from a payment terminal located at the merchant site, the request having a format type;
        determine, via the processor located at the merchant site, the format type of the request from among a plurality of predetermined second format types; and
        identify a host computer configured to process the determined format type; and
    an interface located at the merchant site, the interface being coupled to the processor and configured to:
        transmit the request to the identified host computer.

20. The system of claim 19 wherein the processor is further configured to:
    receive a notification from the identified host indicating whether the request is approved.

21. The system of claim 19, wherein the interface is further configured to:
    receive a notification from the identified host indicating whether the request contains an error message.

22. The system of claim 20, wherein the processor is further configured to:
    send the notification to the payment terminal.

23. The system of claim 21, wherein the processor is further configured to:
    send the notification to the payment terminal.

24. The system of claim 19, wherein the request comprises data packets having header information.

25. The system of claim 24, wherein the processor is further configured to:
    encode the header information to enable communication of the request between the payment terminal and the host computer.

26. The system of claim 25 wherein, the header information is encoded using an Extensible Markup Language.

27. The system of claim 19, wherein the request for processing the electronic payment transaction relates to authorizing the transaction.

28. The system of claim 19, wherein the request for processing the electronic payment transaction relates to settling the transaction.

29. A system for settling a plurality of electronic payments, comprising:
    a processor located at a merchant site, the processor configured to:
        request information relating to settlement of a plurality of electronic payments, from at least one payment terminal;
        receive at least one respective data packet having settlement information for each payment of said plurality of electronic payments;
        determine, via the processor located at the merchant site, a format type of each respective data packet from among a plurality of predetermined second format types; and
        identify a host computer configured to process the determined format type of each respective data packet; and an interface coupled to the processor, the interface configured to:

transmit each respective data packet to the respective identified host computer, wherein the identified host computer is configured to process the format type of said each respective data packet.

30. The system of claim 29 wherein the interface is further configured to:

receive a notification from the identified host indicating whether the settlement is processed.

31. The system of claim 29 wherein the interface is further configured to:

receive a notification from the identified host indicating whether the settlement generates an error message.

32. The system of claim 30 wherein the processor is further configured to:

send the notification to the payment terminal.

33. The system of claim 31 wherein the processor is further configured to:

send the notification to the payment terminal.

34. The system of claim 29 wherein the request comprises data packets having header information.

35. The system of claim 34 wherein the processor is further configured to:

encode the header information to enable communication of the request between the payment terminal and the host computer.

36. The system of claim 35 wherein the header information is encoded using an Extensible Markup Language.

37. The system of claim 29 wherein the request for processing the electronic payment transaction is received from the payment terminal by a serial connection.

38. The system of claim 29 wherein the request for processing the electronic payment transaction is received from the payment terminal by a an Internet protocol connection.

39. The system of claim 38 wherein the Internet protocol connection comprises a TCPIIP connection.

40. The system of claim 19, wherein the processor transmits the request to the host computer over the Internet.

41. The system of claim 19, wherein the processor transmits the request to the host computer by modem.

42. The method of claim 1, comprising:

receiving, by a processor located at a merchant site, a request to process an electronic payment transaction from at least one payment terminal located at the merchant site, the request having a data format type; and determining, by the processor, the format type of the request from among a plurality of predetermined second data format types.

43. The method of claim 1, wherein the request relates to an authorization transaction.

44. A method to process electronic payment transactions, comprising:

receiving, by a processor located at a merchant site, a plurality of requests to process electronic payment transactions from a plurality of payment terminals located at the merchant site and separate from the processor, each request having a respective format type;

determining, by the processor located at the merchant site, the format type of each request;

identifying, by the processor located at the merchant site, a host computer configured to process each determined format type; and transmitting each request to the respective identified host computer.

45. A system to process electronic payment transactions, comprising:

a plurality of terminals located at a merchant site, each terminal being configured to:

receive a request to process one or more electronic payment transactions; and a processor separate from the plurality of terminals and located at the merchant site, the processor being configured to:

receive, from the plurality of terminals, a plurality of requests to process one or more electronic payment transactions, each request having a respective format type;

determine, via the processor located at the merchant site, the format type of each request; and identity a host computer configured to process each determined format type; and an interface configured to:

transmit each request to the respective identified host computer.

46. A method to process electronic payment transactions, comprising:

receiving, by a plurality of terminals at a merchant site, a plurality of requests to process one or more electronic payment transactions, each request having a respective format type;

receiving the plurality of requests from the plurality of terminals, by a processor located at a merchant site and separate from the plurality of terminals;

determining, by the processor located at the merchant site, the format type of each request;

identifying, by the processor, a host computer configured to process each determined format type; and transmitting each request to the respective identified host computer.

* * * * *

UNITED STATES PATENT AND TRADEMARK OFFICE
CERTIFICATE OF CORRECTION

| | |
|---|---|
| PATENT NO. | : 7,577,599 B2 |
| APPLICATION NO. | : 10/799254 |
| DATED | : August 18, 2009 |
| INVENTOR(S) | : Sanchez et al. |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 643 days.

Signed and Sealed this

Seventh Day of September, 2010

David J. Kappos
*Director of the United States Patent and Trademark Office*